United States Patent [19]
Goodacre

[11] 3,854,748
[45] Dec. 17, 1974

[54] INDUSTRIAL PALLET AND STILLAGE TRUCKS

[75] Inventor: Cecil Goodacre, Basingstoke, England

[73] Assignee: Lansing Bagnall Limited, Basingstoke, Hampshire, England

[22] Filed: Apr. 3, 1973

[21] Appl. No.: 347,366

[30] Foreign Application Priority Data
Apr. 10, 1972  Great Britain.................... 16485/72

[52] U.S. Cl. ............................ 280/43.12, 254/2 R
[51] Int. Cl................................................B62b 3/02
[58] Field of Search.......... 280/43.12; 254/2 R, 8 R; 92/31

[56] References Cited
UNITED STATES PATENTS

| | | | |
|---|---|---|---|
| 2,968,841 | 1/1961 | Vance | 254/2 R X |
| 3,090,244 | 5/1963 | Davis | 92/31 X |
| 3,462,167 | 8/1969 | Rateau | 280/43.12 |
| 3,601,423 | 8/1971 | Goodacre | 280/43.12 |

Primary Examiner—David Schonberg
Assistant Examiner—Michael J. Forman
Attorney, Agent, or Firm—Cushman, Darby & Cushman

[57] ABSTRACT

An industrial pallet or stillage truck has a body portion, two hydraulic rams for raising a root portion of a load carrying portion, and a linkage having ground engaging members for raising and lowering the end of the load carrying portion remote from the root portion. The rams each have a standing part mounted on the body portion and a movable part connected to the load carrying portion. The linkage includes two levers each of which is pivotally connected at its fulcrum to the root portion of the load carrying portion and also pivotally connected to the standing part of one of the rams. At least one of the rams has its standing part adjustably mounted on the body portion whereby longitudinal movement of the standing part moves the respective lever and adjusts the position of the associated ground engaging member relative to the load carrying portion.

6 Claims, 4 Drawing Figures

3,854,748

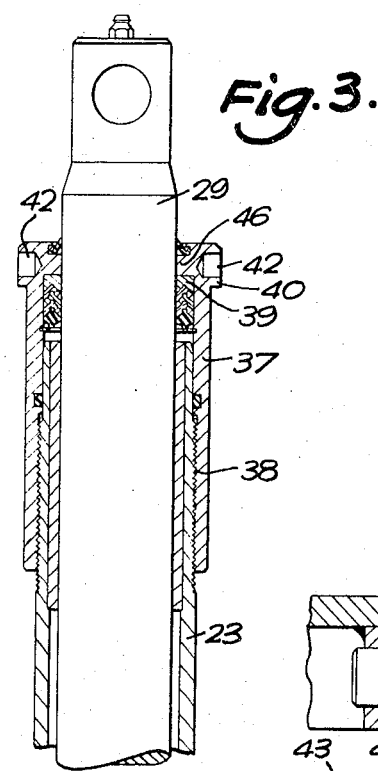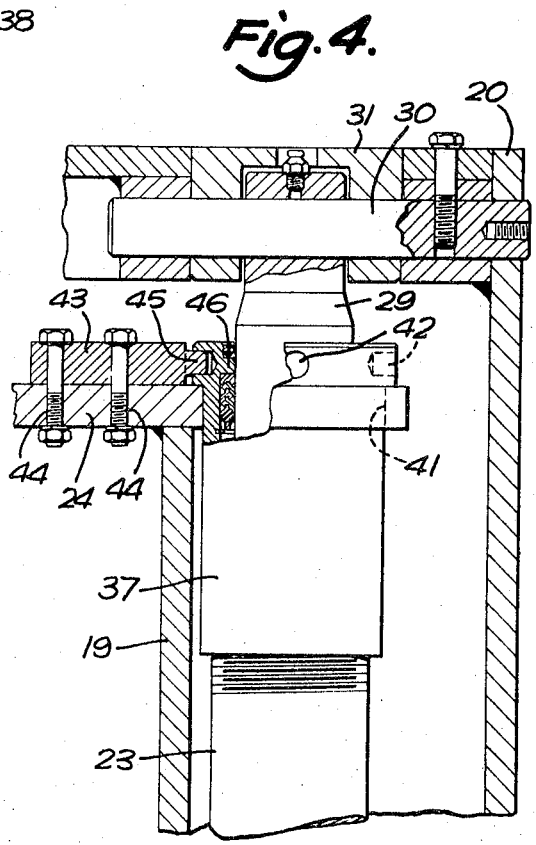

INDUSTRIAL PALLET AND STILLAGE TRUCKS

BACKGROUND OF THE INVENTION

Field of the Invention

The invention relates to industrial pallet and stillage trucks of the kind comprising a body portion, a load carrying portion mounted for up and down movement relatively to the body portion, two hydraulic rams for raising a root portion of the load carrying portion, and a linkage operated by movement of the root portion relatively to the body portion and including ground engaging members for raising and lowering the end of the load carrying portion remote from the root portion, in unison with the root portion, each ram comprising a standing part connected to the body portion and a movable part connected to the load carrying portion, and the linkage comprising two operative levers each pivotally connected at its fulcrum to said root portion and also being pivotally connected directly to the lower end of the standing part of one of the rams, whereby up and down movement of the root portion imparts pivoting movement to the levers to operate said linkage.

In such a truck it is desirable to be able to adjust the linkage so that one of the ground engaging members may be adjusted up or down, independently of the other ground engaging member, to ensure that both members can be fully retracted into the load carrying portion. Hitherto this adjustment has been achieved by arranging for a member of the linkage, between each lever and its associated ground engaging member, to be adjustable in length.

The invention sets out to provide an improved method of enabling the adjustment of the ground engaging members to be effected.

SUMMARY

According to the invention an industrial pallet or stillage truck of the kind referred to is characterized in that at least one of the rams has its standing part mounted on the body portion in such a manner as to be adjustable longitudinally with respect to the body portion, whereby longitudinal adjustment of the standing part of said one ram moves the lever connected to that standing part and thereby adjusts the position of the associated ground engaging member with respect to the load carrying portion. Since the mountings for the rams are generally more accessible than the parts of the linkage, the arrangement according to the invention can provide a more convenient means of adjusting the ground engaging members.

Preferably the cylinder of said one ram constitutes the standing part thereof and the piston of said one ram constitutes the movable part.

The rams may extend in an up and down direction on the body portion.

The standing part of said one ram may comprise two portions in threaded engagement with one another, one portion being rotatable and the other portion being non-rotatable so that rotation of the first portion causes the second portion to move longitudinally, the lever associated with said one ram being connected to said second portion so that the longitudinal movement thereof moves the lever.

Preferably releasable detent means are provided to retain the first portion in a required rotational position.

Preferably both rams have their standing parts mounted on the body portion in such a manner as to be adjustable longitudinally with respect to the body portion.

BRIEF DESCRIPTION OF THE DRAWINGS

FIG. 3 is a vertical section through the upper part of one of the hydraulic rams of the truck shown in FIG. 1; and FIG. 4 is a rear view, partially in section, of the right-hand ram of the truck shown in FIG. 1.

DESCRIPTION OF THE PREFERRED EMBODIMENT

Figure 1:
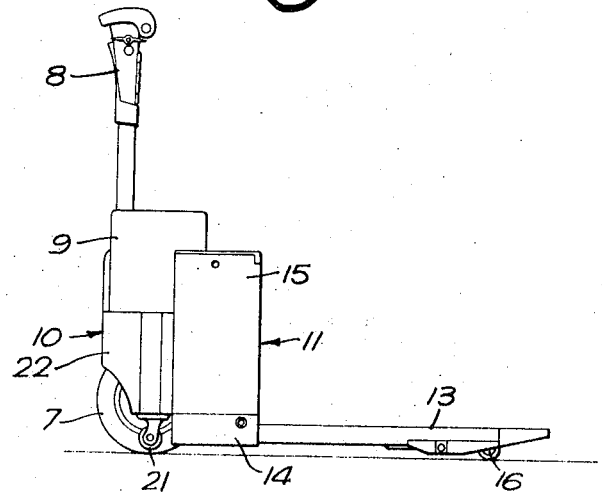
FIG. 1 is a side elevation by way of example, of an industrial pallet truck.
Figure 2:
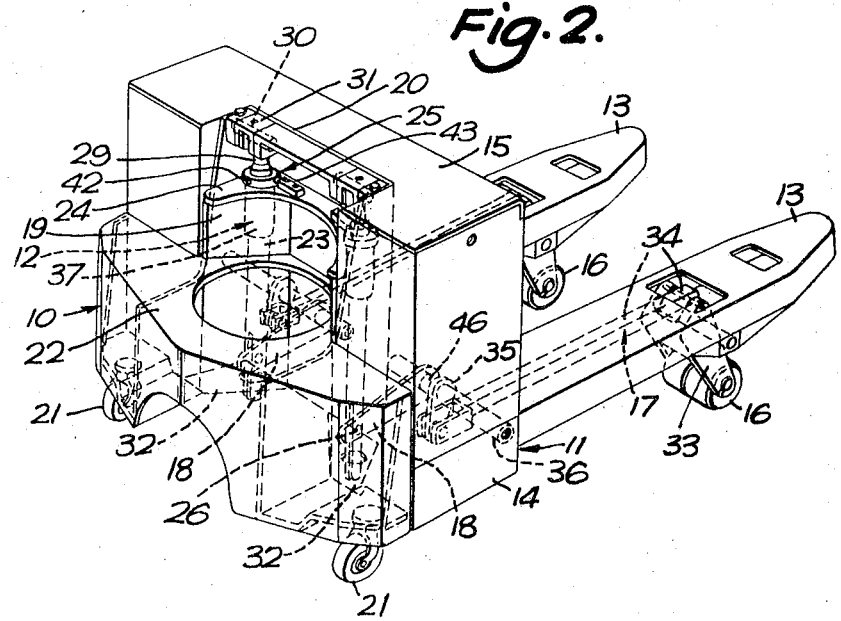
FIG. 2 is a perspective view of part of the truck shown in FIG. 1.

With reference to FIGS. 1 and 2, a pedestrian controlled, electrically operated industrial pallet truck comprises a body portion 10 and a load carrying portion 11 which is movable relatively to the body portion in a substantially vertical direction by a pair of hydraulic rams 12. The load carrying portion 11 comprises a pair of forks 13 joined together by a transverse root portion 14 which comprises a platform for the truck's storage battery. In this embodiment, the battery is provided in two parts housed in a container 15. The ends of the forks 13 which are remote from the root portion 14 are supported on trail wheels 16 which are connected to each other and to the root portion 14 by a known form of linkage 17, described below, whereby the ends of the forks supported by the trail wheels 16 are raised and lowered together with the root portion.

As will be seen from FIG. 2, the body portion 10 comprises an upright U-shaped frame 19 which is nested within a U-shaped upright frame 20 on the load carrying portion 11. Castor wheels 21 are mounted at the lower end of the frame 19 of the body portion.

The body portion 10 is provided with a further support frame 22 which projects horizontally away therefrom. Mounted on the frame 22 is the electrical control gear, the hydraulic pump and motor of the truck (disposed within a casing indicated at 9 in FIG. 1). The control gear is operated, in known manner, from a control arm 8. Also mounted below the frame 22 is a ground wheel 7 which is driven by an electric motor mounted in the hub of the wheel and is steerable by the control arm 8.

The above mentioned rams 12 are mounted vertically between the frame 19 of the body portion 10 and the frame 20 of the load carrying portion 11. In the arrangement of FIGS. 1 and 2 the rams 12 comprise cylinders 23 having their upper ends attached to a plate 24 on the upper end of the frame 19 by adjustable mountings 25 which will be described below. The lower ends of the cylinders 23 are forked and are pivotally connected to levers 18 of the linkage 17 by pivot pins 26. The portions of the forked ends of the cylinders 23 projecting below the pivot pins 26 pass through holes in laterally projecting horizontal parts 32 at the lower end of the frame 19. Movement of the lower ends of the cylinders 23, in a direction longitudinally of the truck, is thereby precluded. The rams 12 have pistons 29 which project from the upper ends of the cylinders 23 and are pivotally connected by pivot pins 30 to brackets 31 attached to the frame 20. Hence extension of the rams 12 will raise the frame 20 and the root portion 14 of the load carrying portion 11 with the battery containers 15 relatively to the body portion, and contraction of the rams 12 will lower the root portion of the load carrying portion relatively to the body portion.

The trail wheels 16 are mounted on arms 33 pivotally mounted at the ends of the fork arms 13. Pivotally connected to each arm 33, above its pivot axis, is one end of a push rod 34, the other end of which is forked and pivotally connected to a lever arm 35 secured to a sleeve 46 which is freely rotatable on a fixed shaft 36 which is mounted in the root portion 14 of the load carrying portion 11. Also secured to each sleeve 46 is one of the aforementioned levers 18 which are connected to the lower ends of the cylinders 23. It will thus be seen that as the root portion 14 (and hence the shafts 36) is raised relatively to the body portion 10 by extension of the rams 12, the levers 18 will cause the sleeves 46 to rotate so that the arms 35 pivot and impart longitudinal movement to the push rods 34. This swings the arms 33 downwardly, lowering the trail wheels 16 and raising the ends of the fork arms 13. Similarly the trail wheels 16 are raised and the fork arms 13 lowered as the root portion 14 is lowered relatively to the body portion by contraction of the rams 12.

It will be appreciated that it is necessary for the trail wheels 16 to be raised and lowered by the same amount so that the fork arms 13 are both level. Due to manufacturing tolerances and/or wear or damage to the component parts of the linkages 17 it may happen that the trail wheels 16 are not raised and lowered by the same amount and it is desirable to provide an adjustment whereby one trail wheel may be raised or lowered independently of the other. Hitherto this has been achieved by providing a link adjustment device in each of the push rods 34. However this has the disadvantage that the adjustment device is only accessible from underneath the truck and in practice it is necessary for the truck to be tipped on its side or jacked up to gain access to the adjustment device. Also the adjustment device usually involves forming each push rod 34 in two parts which are bolted together with a distance piece between them, the adjustment being effected by replacing or packing out the distance piece. Alternatively the two parts may be in adjustable threaded engagement. Either arrangement tends to weaken the push rods.

In this embodiment according to the present invention the cylinders 23 of the rams 12 are mounted on the frame 19 by the above-mentioned adjustable mountings 25 which enable the cylinders to be adjusted vertically with respect to the frame 19. It will be seen that upward movement of one of the ram cylinders 23 with respect to the frame 19 will cause its associated lever 18 to swing upwardly. This will cause a corresponding swinging movement of the associated arm 35 which imparts slight longitudinal movement to the push rod 34 connected to that arm, and hence causes slight upward movement of the associated trail wheel 16. This movement is independent of any movement of the other trail wheel 16. Thereby one trail wheel 16 may be adjusted relatively to the other trail wheel to level the fork arms 13. This arrangement allows each push rod 34 to be made from a one-piece bar or tube which is stronger and less costly than the previous constructions, and is particularly advantageous when used on trucks carrying very heavy loads.

FIG. 3 shows the adjustable mounting 25 provided on the upper end of each ram cylinder 23. As shown in that figure the upper end of each cylinder 23 is closed by an upwardly projecting sleeve 37 which is in screw threaded engagement at 38 with the cylinder 23. The upper end of the sleeve 37 is closed by an inwardly extending radial rib 46 and contains a gland 39 through which passes the piston 29 of the ram. The upper end of the sleeve 37 is also formed with an outwardly projecting radial flange 40.

FIG. 4 shows the ram of FIG. 3 mounted on the pallet truck of FIG. 1. The sleeve 37 of the ram passes through an aperture 41 in the upper plate 24 of the frame 19 of the truck. The flange 40 overlies the upper surface of the plate 24. As described earlier the plunger 29 of the ram is secured to a bracket 31 on the frame 20, by means of a pivot pin 30.

A number of radial holes 42 (in this embodiment four equally spaced holes) are provided around the flange 40 so that a lever tool may be inserted in one of the holes to rotate the sleeve 37 and thereby adjust the ram cylinder 23 up or down. To secure the sleeve 37 in the position to which it has been adjusted there is provided a stop plate 43 which is secured to the upper plate 24 by bolts 44 and which has a cylindrical end portion 45 which projects into one of the holes 42 when the stop plate 43 is bolted in position. It will be appreciated that the stop plate 43 must be unbolted from the plate 24 before the sleeve 37 can be rotated.

If desired only one of the rams 12 may be provided with an adjustable mounting 25. However, it is preferred that both of the rams 12 are provided with an adjustable mounting 25, as in the case of this embodiment, so that adjustment of both trail wheels 16 is possible. Preferably the adjustment of the trail wheels 16 is carried out when the fork arms 13 are in the lowered position, to ensure that both wheels are fully retracted into the fork arms.

The invention may also be applied to an industrial stillage truck in which the forks 13 are replaced by a load carrying platform.

I claim:

1. An industrial pallet or stillage truck comprising a body portion, a load carrying portion mounted for up and down movement relatively to the body portion, two hydraulic rams for raising a root portion of the load carrying portion, and a linkage operated by movement of the root portion relatively to the body portion and including ground engaging members for raising and lowering the end of the load carrying portion remote from the root portion, in unison with the root portion, each ram comprising a standing part connected to the body portion and a movable part connected to the load carrying portion, and the linkage comprising two operative levers each pivotally connected at its fulcrum to said root portion and also being pivotally connected directly to the lower end of said standing part of one of the rams, whereby up and down movement of the root portion imparts pivoting movement to the levers to operate said linkage, and means for mounting the standing part of at least one of said rams to said body portion so that it is adjustable longitudinally with respect to said body portion, whereby longitudinal adjustment of the standing part of said one ram moves the lever connected to that standing part and thereby adjusts the position of the associated ground engaging member with respect to the load carrying portion.

2. A truck as claimed in claim 1, wherein one cylinder of said one ram constitutes the standing part thereof and the piston of said one ram constitutes the movable part.

3. A truck as claimed in claim 1, wherein the rams extend in an up and down direction on the body portion.

4. A truck as claimed in claim 1 wherein means are provided for mounting the standing part of each of said rams to said body portion so that they are individually adjustable longitudinally with respect to said body portion.

5. A truck as claimed in claim 1, wherein the standing part of said one ram comprises first and second portions in threaded engagement with one another, said first portion being rotatable and said second portion being non-rotatable so that rotation of the first portion causes the second portion to move longitudinally, the lever associated with said one ram being connected to said second portion so that the longitudinal movement of said second portion moves the lever.

6. A truck as claimed in claim 5, wherein releasable detent means are provided to retain the first portion in a required rotational position.

* * * * *